UNITED STATES PATENT OFFICE.

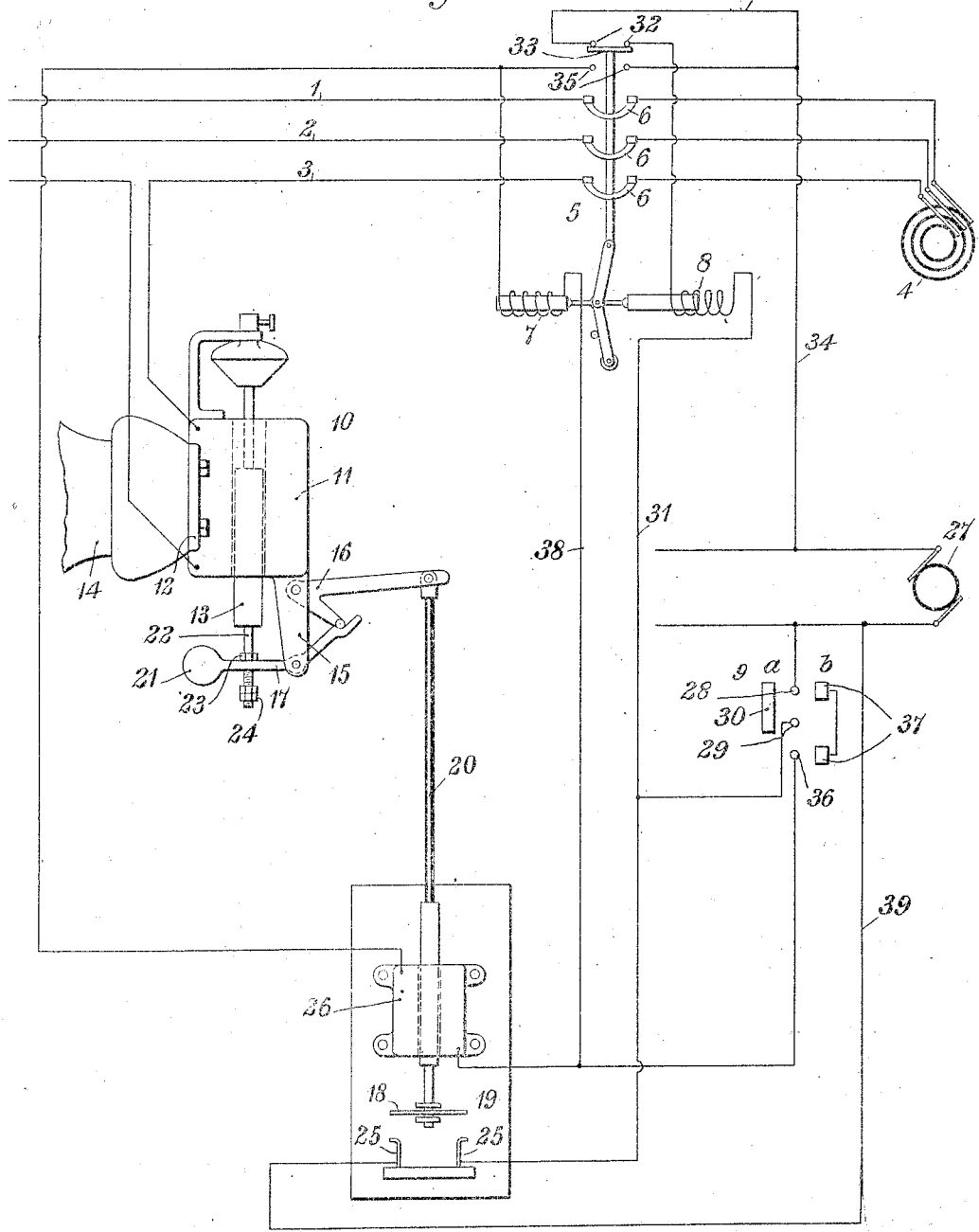

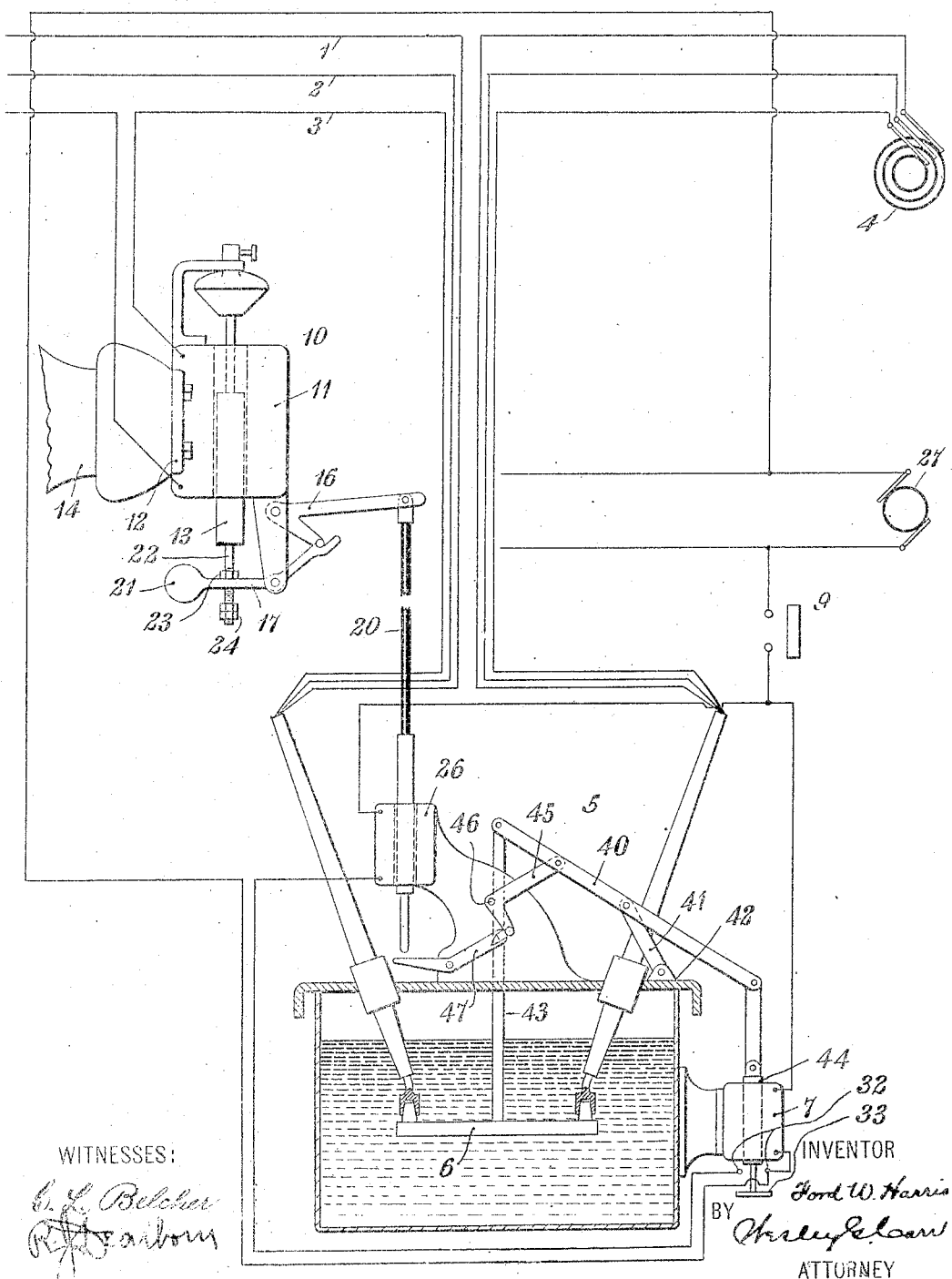

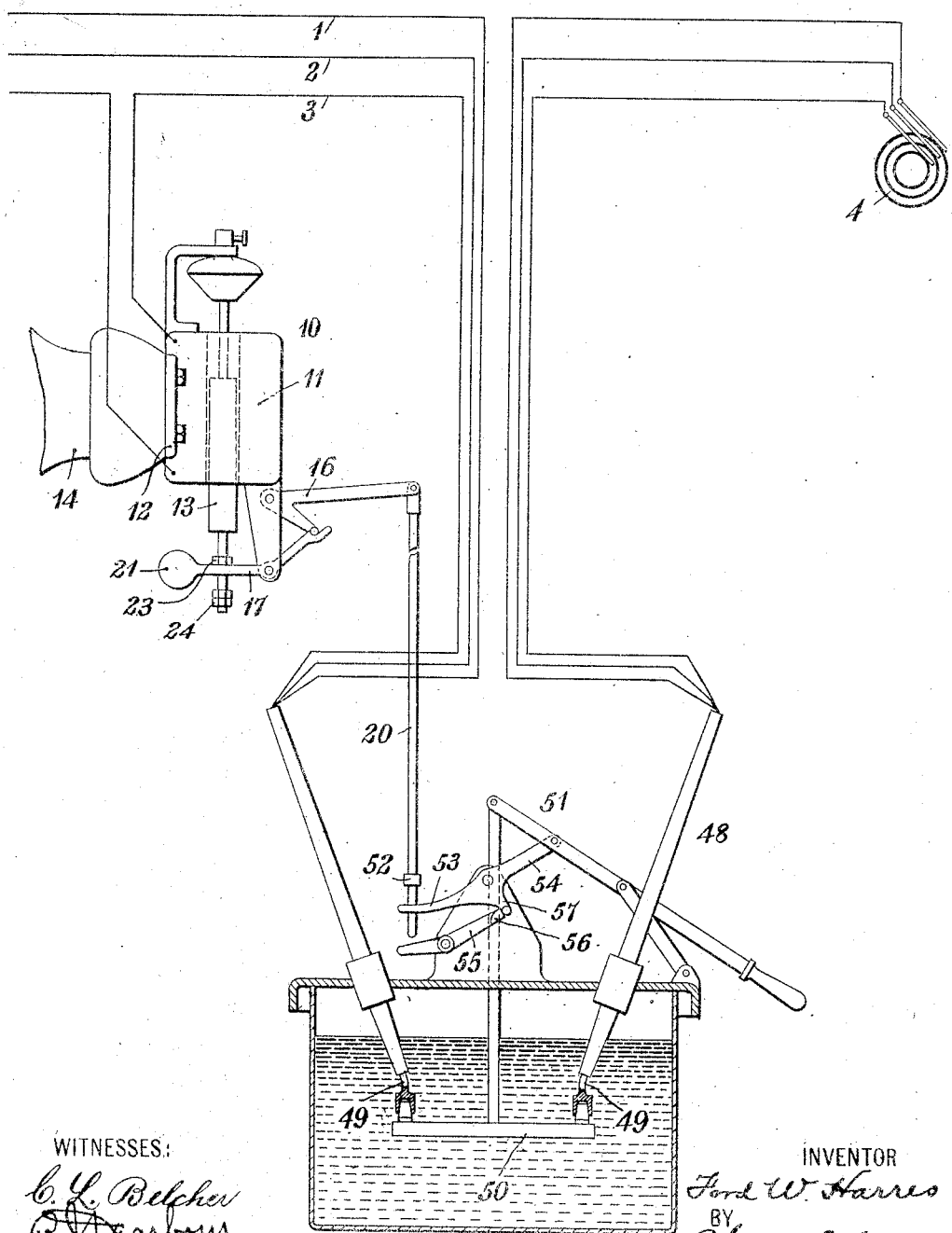

FORD W. HARRIS, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-CIRCUIT PROTECTION.

975,420.     Specification of Letters Patent.    Patented Nov. 15, 1910.

Application filed January 21, 1909. Serial No. 473,528.

*To all whom it may concern:*

Be it known that I, FORD W. HARRIS, a citizen of the United States, and a resident of Wilkinsburg, in the county of Allegheny and State of Pennsylvania, have invented a new and useful Improvement in Systems of Electric-Circuit Protection, of which the following is a specification.

My invention relates to systems of distribution embodying automatic circuit interrupters, and it has for its object to provide simple and adequate means that is directly dependent upon, and is adapted for use in connection with, electric circuits of very high voltage for actuating a suitable automatic circuit interrupter.

Automatic circuit breakers for high-voltage lines are usually actuated by energy obtained from the secondary winding of a series transformer in order to avoid the care and expense involved in the construction and insulation of high-potential magnet coils. But, if the potential of the circuit to be protected is twenty five thousand volts, or higher, series transformers suitable for this service are liable to insulation troubles and are impracticable by reason of their expense.

According to my present invention, I provide an electro-magnet which is connected directly in the circuit of the high-voltage line and is supported by one of the line insulators or by a base of porcelain or other suitable insulating material so that none of its parts are grounded. Consequently, it is necessary only to insulate the electro-magnet against the potential difference due to the drop in its own windings, and it may be adapted to either operate a relay switch, at a considerable distance, through a long insulating rod or bar, or it may act directly upon the tripping mechanism of the automatic circuit interrupter through the mechanical intervention of the insulating rod.

Figure 1 of the accompanying drawings is a diagrammatic view of a system of distribution embodying my invention and Figs. 2 and 3 are similar views of slightly modified arrangements, in which the relay switch of Fig. 1 is omitted.

Referring to Fig. 1, alternating current energy of very high potential is supplied to a transmission line 1—2—3 from any suitable source, such as generator 4, through a circuit interrupter 5. The circuit interrupter comprises a plurality of bridging contact members 6 which normally complete the polyphase circuit of the transmission line and which are adapted to interrupt the three phases of the circuit simultaneously, and also a closing magnet 7 and a release magnet 8.

The operation of the interrupter is governed either by a master controller 9 or, automatically, by means of an electro-magnet 10 having winding 11 that is connected in the interrupted line 3. The electro-magnet 10 comprises a stationary frame 12, a movable core member 13 and a winding 11, the frame 12 being either secured to one of the line insulators or mounted upon an insulating support 14. The stationary frame 12 is provided with a projection 15 upon which bell crank levers 16 and 17 are pivotally mounted. One arm of the bell crank lever 16 is connected to the movable contact member 18 of a relay switch 19 through a long insulating rod or bar 20, its other arm being adapted to engage one end of the bell crank lever 17 which serves as a latch and opposes the rotative movement of the bell crank lever 16 which the weight of the rod 20 tends to effect. The opposite end of the bell crank lever 17 is enlarged to provide a weight 21 which tends to hold the latch in the position indicated above, and the armature 13 of the electro-magnet 10 is connected to the weighted arm of the lever 17 by a rod 22, that extends through a suitable slot in the lever and is provided with nuts 23 and 24 to limit the relative movement between the two parts.

The relay switch 19 comprises stationary contact members 25, which are bridged by the contact member 18, under predetermined conditions, and an opening magnet 26 which, when energized, serves to raise the rod or bar 20.

The operation of the system is as follows: Assuming that the circuit interrupter is closed and that the parts of the electro-magnet 10 occupy the positions indicated in Fig. 1 of the drawings, if it is desired to interrupt the circuit 1—2—3, the master switch 9 may be moved to occupy a position *a* in which a circuit is completed from any convenient low-voltage, and preferably direct current, source, such as generator 27, through contact fingers 28 and 29 (which are bridged by contact member 30), conductor 31, release magnet winding 8, contact members 32 (which are bridged by contact member 33 when the circuit interrupter 5 is closed), and conductor 34 to the opposite terminal of the generator 27. When energized, the electro-magnet 8 serves to open the circuit interrupter and also to interrupt its own circuit, since the contact member 33 moves into engagement with contact members 35 when the interrupter occupies its open position.

The circuit interrupter may be closed by moving the master switch into position b in which a circuit is completed through contact fingers 28 and 36 (which are bridged by contact member 37), conductor 38, closing coil 7, contact fingers 35 and conductor 34, to the opposite terminal of the generator 27.

If the circuit interrupter is closed and the current traversing the transmission circuit 1—2—3 exceeds an amount predetermined by the position or by the weight of the core member 13 of the electro-magnet 10, this member will be raised and the bell crank lever 17 will be moved through a predetermined angle which is sufficient to release the bell crank lever 16 and permit the rod or bar 20 to fall. This action closes the relay switch 19, and a circuit is established from the generator 27 through the conductor 39, contact members 25 and 18, conductor 31, and release magnet 8, from which point the circuit is completed as above indicated.

When the circuit interrupter has been opened, either manually or automatically, and the master switch has been moved into position b, the closing coil will be energized, as indicated above, and, at the same time, a circuit will be completed through the resetting magnet coil 26 which is adapted to raise the rod 20 sufficiently to allow the latch 17 to set itself, so that, when the magnet 26 is interrupted by the final closing of the breaker, the relay switch will be held open. Should the latch fail to catch and, for any reason, such as an overload in the circuit, to hold the rod 20 when the interrupter is closed and the rod is raised, as above indicated, the rod will fall back and immediately open the breaker.

Referring to Fig. 2 of the drawings, in which corresponding parts are designated by the same reference characters, the circuit interrupter 5, as here shown, comprises bridging contact members 6, an actuating lever 40 and a link 41, the ends of which are pivotally attached to the lever and to a stationary frame 42, respectively, one end of the lever 40 being connected to the bridging contact member by a rod 43 and its opposite end being connected to an armature 44 of the closing magnet 7.

A bell crank lever 45, which is mounted upon a stationary shaft 46, is connected to the lever 40 substantially midway between the points of connection of the parts 41 and 43 and this lever. The opposite extremity of the bell crank lever 45 is engaged by a latch 47, when the interrupter is closed, and the arrangement of parts is such that the lower end of the rod or bar 20 strikes the latch 47 when the lever 16 is released and the rod is permitted to fall.

The circuit interrupter may be closed by energizing the magnet 7, which is connected in circuit with the resetting magnet 26.

As shown in Fig. 3 of the drawings, my invention may be adapted for use with a manually operated circuit interrupter 48 which comprises stationary contact members 49, movable bridging contact members 50, and an operating mechanism 51, by mechanically connecting the insulating rod or bar 20 to the operating mechanism by a lost motion connection so that the opening of the device will raise the rod and reset the latch 17. The lost motion connection referred to may be effected by any suitable means, the rod 20 being here shown as provided with an enlargement 52 which is engaged by a bifurcated projection 53 on a bell crank lever 54 that constitutes a portion of the operating mechanism 51. The lower end of the rod 20 is adapted to release a latch 55 having a projection 56 which engages an arm 57 of the bell crank lever 54, when the circuit breaker is closed. The arrangement of parts is such that the opening of the breaker serves to raise the rod 20 sufficiently to permit the latch 17 to restrain it and, consequently, when the breaker is closed, the rod is free to fall so as to release the latch 55, when the latch 17 is again operated to release the lever 16.

It may be desirable, in some cases, to use the resetting magnet 26 in connection with the manually operated circuit interrupter of Fig. 3, in which case, the circuit of the resetting coil will be made and broken by the opening and closing of the interrupter, as in the arrangement shown in Fig. 2.

Modifications in the circuit arrangement of the systems and variations in the structural details of the devices embodied therein may be effected within the spirit and scope of my invention.

I claim as my invention:

1. The combination with a high-voltage electric circuit, a circuit interrupter therefor, a release magnet for the interrupter, and a relay switch for governing the release magnet, said switch comprising a movable contact member, a relatively long rod or bar secured thereto and an electro-magnet for raising the rod or bar, of a high-voltage electro-magnet depending upon the high-voltage circuit for its energy, a latch for holding the rod or bar and the movable contact member of the relay switch in an open circuit position, said high-voltage electro-magnet being adapted to release the holding means.

2. The combination with a high-voltage circuit, a circuit interrupter, a rod or bar for tripping the interrupter, electro-responsive means for raising the rod or bar and means for holding it in its raised position, of a high-voltage electro-magnet associated with the high-voltage circuit for releasing the holding means.

3. The combination with a high-voltage circuit, a circuit interrupter, a rod or bar for tripping the interrupter, electro-responsive means for raising the rod or bar and means for holding it in its raised position, of a high-voltage electro-magnet associated with the high-voltage circuit for releasing the holding means and an auxiliary switch operatively connected to the circuit interrupter for opening the circuit of the lifting magnet except when the circuit interrupter is open.

4. The combination with a high-voltage circuit, a circuit interrupter therefor, a low-voltage circuit, a release magnet for the interrupter adapted to be energized from the low-voltage circuit, a relay switch comprising stationary and movable contact members for governing the release magnet, and a rod or bar operatively connected to the movable contact member of the relay switch, of means for opening the relay switch and raising the rod or bar, a latch for restraining the rod or bar and an electro-magnet energized from the high-voltage circuit for releasing the rod or bar under predetermined conditions on the high-voltage circuit.

In testimony whereof, I have hereunto subscribed my name this 14th day of January, 1909.

FORD W. HARRIS.

Witnesses:
H. G. MacDonald,
Birney Hines.